(12) United States Patent
Kajander

(10) Patent No.: US 7,723,930 B2
(45) Date of Patent: May 25, 2010

(54) METHOD AND SYSTEM IN CONNECTION WITH TENSION MEASUREMENT OF MATERIAL WEB

(75) Inventor: Vesa Kajander, Nurmijarvi (FI)

(73) Assignee: ABB Oy, Helsinki (FI)

( * ) Notice: Subject to any disclaimer, the term of this patent is extended or adjusted under 35 U.S.C. 154(b) by 336 days.

(21) Appl. No.: 12/000,299

(22) Filed: Dec. 11, 2007

(65) Prior Publication Data

US 2008/0135666 A1 Jun. 12, 2008

(30) Foreign Application Priority Data

Dec. 12, 2006 (FI) .................................. 20065792

(51) Int. Cl.
*B65H 23/198* (2006.01)
(52) U.S. Cl. .............................................. 318/3; 318/6
(58) Field of Classification Search ...................... 318/3, 318/6, 9, 432
See application file for complete search history.

(56) References Cited

U.S. PATENT DOCUMENTS

| | | | | |
|---|---|---|---|---|
| 5,804,932 | A | * | 9/1998 | Yanagisawa .................... 318/6 |
| 6,338,447 | B1 | * | 1/2002 | Stanier et al. ........... 242/155 M |
| 6,473,669 | B2 | * | 10/2002 | Rajala et al. ................. 700/122 |
| 6,856,850 | B2 | * | 2/2005 | Rajala et al. ................. 700/122 |
| 2002/0063541 | A1 | | 5/2002 | Cote et al. |

FOREIGN PATENT DOCUMENTS

| | | |
|---|---|---|
| JP | 5-312658 A | 11/1993 |
| JP | 2003-247902 A | 9/2003 |

* cited by examiner

*Primary Examiner*—Rina I Duda
(74) *Attorney, Agent, or Firm*—Buchanan Ingersoll & Rooney PC

(57) ABSTRACT

Method and system in connection with a motor operated tension measuring roll (1) for compensating an error in tension measuring of a continuous material web, the method comprising defining the tension $T_{meas}$ of a material web (4) by a force sensor (3) provided at the tension measuring roll. The method comprises defining the frictional couple $T_\mu$ and moment of inertia J of the tension measuring roll before tension measuring during operation, defining a torque $T_{mot}$ generated by the driving motor of the tension measuring roll during operation, defining a torque $T_{wm}$ directed to the material web by the tension measuring roll by subtracting the frictional couple $T_\mu$ and moment of inertia J from the defined torque $T_{mot}$ generated by the driving motor, defining a force $F_T$ directed to the material web on the basis of the torque $T_{wm}$ directed to the material web by the tension measuring roll, defining, on the basis of the force $F_T$ directed to the material web, a component of force $F_{Tm}$ of the measuring sensor in the measuring direction directed to the material web by the tension measuring roll, and subtracting from the tension $T_{meas}$ defined by the force sensor the component of force $F_{Tm}$ of the measuring sensor in the measuring direction directed to the material web by the tension measuring roll to provide a corrected measuring signal.

11 Claims, 1 Drawing Sheet

METHOD AND SYSTEM IN CONNECTION WITH TENSION MEASUREMENT OF MATERIAL WEB

BACKGROUND OF THE INVENTION

The invention relates to defining the tension of a continuous material web, and especially to eliminating error components in the definition of the tension of a continuous material web.

Many industrial production or further-processing machines measure the tension of a continuous material web. Examples of such material web materials are papers and other commodities made of fibre, fabrics, threads, plastic and metal films and other materials whose tension is defined during their production or further processing. In connection with paper-making and further processing, for instance, the tension of the paper web is measured and adjusted at several points of the web. These points include coating stations and reel-ups. Measuring the tension of the web and making the adjustments based thereon aims at a uniform quality of the web material and an improved runnability of the production or further-processing machine.

One known manner of defining the tension of a material web is to measure it with one or more force sensors attached to a measuring roll. The force sensor can be mounted on one or more positions mechanically connected to the roll, typically under bearing cups at the ends of the roll, in which case the force sensors at least partly support the measuring roll. When moving to this roll, the material web forms a force component that is in the measuring direction of the sensor. A measuring roll often also has its own rotating drive. The roll can then be used not only to measure but also to transport the material web.

The angle of the material web passing over the measuring roll is often such that the torque of the drive rotating the measuring roll affects the measurement, that is, forms in the measuring sensor in its measuring direction a force component that sums with the actual measurable quantity, that is, with the force generated by the material web to the measuring roll.

This problem has been eliminated earlier by attempting to mount the measuring roll in such a manner that the force component generated by the torque of the drive is as small as possible in the measuring direction of the force sensor. However, the travel of the web does not always permit the mounting of the measuring roll and its sensors in an optimum manner for the measurement.

Another way of alleviating the problem is to adjust the measuring roll drive in such a manner that the measuring roll does not pull or slow down the material web. However, this limits the control of the web, because the speed difference of the measuring roll drive and the force directed to the web through it cannot be freely set.

A problem with the above motor drive-equipped measuring arrangement is thus an error component formed in the measurement when the measuring roll is used to actively control the web. However, when the measuring roll is driven at the speed of the web so that it does not pull or slow down the web, it is not actively utilised in controlling the web.

BRIEF DESCRIPTION OF THE INVENTION

It is thus an object of the invention to develop a method and an apparatus implementing the method so that the above-mentioned problems are solved. The object of the invention is achieved by a method and system that are characterised by what is stated in the independent claims. Preferred embodiments of the invention are disclosed in the dependent claims.

The invention is based on setting with a motor drive the torque of a measuring roll to comply with other requirements of the process while taking into consideration force components caused by the measuring roll drive in the measuring result of a measuring sensor.

The method and system of the invention provide the advantage that the travel of the material web in the machine can be more freely planned, because the unwanted components affecting the measurement of the tension of the web can be effectively eliminated with the method. Therefore, in machine design it is not necessary to set similar requirements on the web angle of the measuring roll as before.

Further, the method and system of the invention permit a better than before controllability of the material web, because during the measurement the measuring roll can be used to pull or slow down the web without interfering with the measurement.

BRIEF DESCRIPTION OF THE FIGURES

The invention will now be described in greater detail by means of preferred embodiments and with reference to the attached drawings, in which.

DETAILED DESCRIPTION OF THE INVENTION

Figure 1:
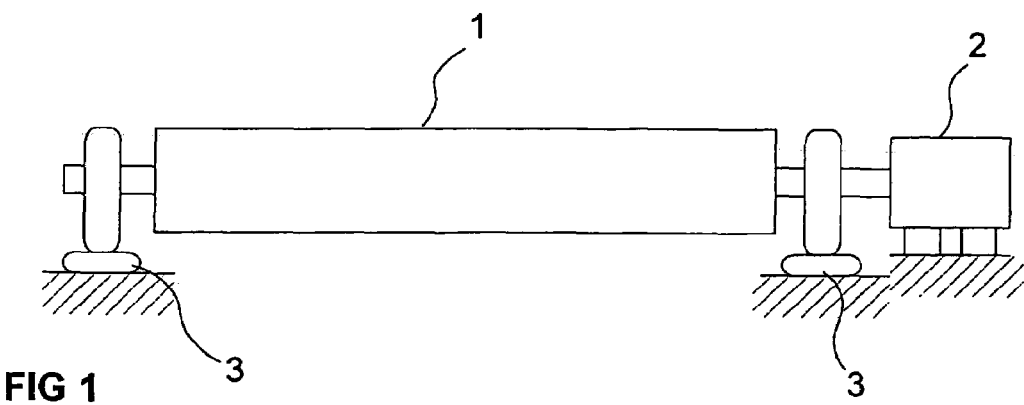
FIG. 1 is a general view of a measuring roll and its drive.

FIG. 1 shows in general a tension measurement roll 1 whose rotating speed can be adjusted with a motor 2. The motor shaft is connected to the roll shaft to rotate it. The roll is supported on bearings at both ends, and force sensors 3 are positioned under the bearing cups of the bearings. In this example, there are two force sensors, but as is known their number may vary from one to several. Tension measurement with force sensors is made in a known manner such that a material web travelling via the roll directs to the roll a force that can be measured with the force sensors.

Figure 2:
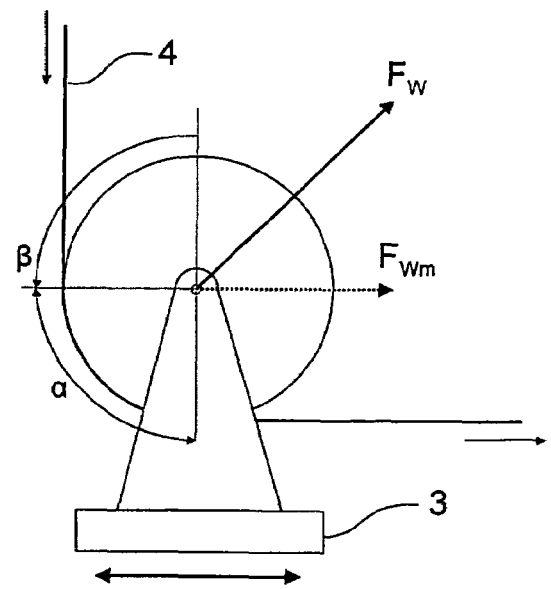
FIGS. 2 and 3 show the cross-section of the measuring roll and force effects directed to the measuring roll.

FIG. 2 shows an end view of the measuring roll. The force sensor 3 positioned to the measuring roll is mounted horizontally in such a manner that the sensor is sensitive to horizontal forces only (shown with a two-headed arrow in the figure). The material web 4, shown as entering the roll from above and exiting it to the right, covers the sector portion of the roll cross-section that is in general referred to as a wrap angle $\alpha$. In the example of FIG. 2, the wrap angle $\alpha$ is approximately 90°.

The material web causes to the roll a force $F_w$ whose magnitude depends on the tension of the material web 4. The direction of the force is in turn determined by the position of the wrap angle on the circle formed by the cross-section of the roll and by the size of the wrap angle. In the case of FIG. 2, the wrap angle is at angle $\beta$ with respect to an imaginary vertical axis. The material web then generates a force in the direction defined by a straight line formed through angle $\beta+\alpha/2$ and the centre point of the roll.

In the case of FIG. 2, the force sensor is positioned so that it measures horizontal forces only. Thus, it measures the projection of force vector $F_w$ with respect to the horizontal, that is, $F_{wm}=F_w \cos(\alpha/2)$.

It is clear that the wrap angle $\alpha$, the above position $\beta$ of the wrap angle, and the measuring direction of the force sensor can all be almost arbitrary. On the basis of the above principle, it is, however, possible in all cases to define the proportion of the component defined by the force sensor of the total force effect directed to the roll. It is then possible to calculate the total force, that is, the tension of the material web, on the basis of this measured force.

In the method of the invention, the tension of a material web is defined with a measuring roll in the manner described above. In the method of the invention, the measuring roll is motor drive-operated.

According to the invention, before using the measuring roll, frictional couple $T_\mu$ and moment of inertia J is defined for the tension measuring roll. The frictional couple and moment of inertia can be measured by using the motor drive of the roll. The frictional couple can be measured in any known manner, for instance by directing a torque with the motor drive to the roll and detecting the magnitude of the torque with which the roll rotates evenly.

Correspondingly, the moment of inertia can be defined by directing with the motor drive a known torque to the roll and determining the acceleration of the roll at this torque. The moment of inertia can also be defined by calculation, if the roll dimensions and mass distribution are known sufficiently accurately.

Of the above quantities, the effect of friction is essentially the same regardless of the rotation speed of the roll. Friction may also depend on speed, and this dependency too can be defined by measurement. Moment of inertia in turn affects by resisting changes in the angular velocity of the roll, that is, when the angular velocity of the roll changes, a torque of a certain magnitude is required to compensate for the change, and this torque depends on the product of defined moment of inertia J and the angular acceleration of the roll.

According to the method of the invention, torque $T_{mot}$ generated by the drive motor of the measuring roll is defined during the use of the measuring roll. The torque generated by the motor is simply obtained from the frequency converted arranged to control the motor. Modern frequency converters provide real-time information on the used torque, and frequency converters can generally also be used under torque control, if desired. According to the method, the magnitude of torque $T_{wm}$ that the tension measuring roll directs to the material web is further defined. This can be done simply by subtracting from the defined drive motor-generated torque $T_{mot}$ forces directed elsewhere than to the web, that is, the forces required to annul the moment of inertia and frictional couple. If the tension measuring roll is rotated at a speed whose surface velocity corresponds to the speed of the material web, the measuring roll does not direct any force effect to the web. The use of the measuring roll then only annuls the frictional forces of the measuring roll and possible inertia masses caused by the acceleration or deceleration of the roll.

When torque $T_{wm}$ directed by the tension measuring roll to the material web is calculated, force $F_T$ directed to the material web can be calculated on the basis of this torque. The force directed to the material web can be measured when the radius r of the measuring roll is known. Force $F_T$ directed to the roll is then a quotient of the torque and measuring roll radius ($F_T=T_{wm}/r$). Because the system between the roll and material web is stationary in relation to the forces, that is, the material web and the roll do not move under the influence of the force between them, the material web applies to the roll a force that is equal to that applied by the roll to the web.

Further, measuring-direction force component $F_{Tm}$ of the measuring sensor is calculated from this force between the measuring roll and material web, and the measuring-direction force component of the measuring sensor directed by the measuring roll to the material web is subtracted from tension $F_{meas}$ defined with the force sensor. The product of this subtraction is corrected measuring result $F_{cor}$ for the web tension, which takes into consideration the effect of the torque caused by the motor and the effects of the frictions and inertia mass of the roll.

Figure 3:
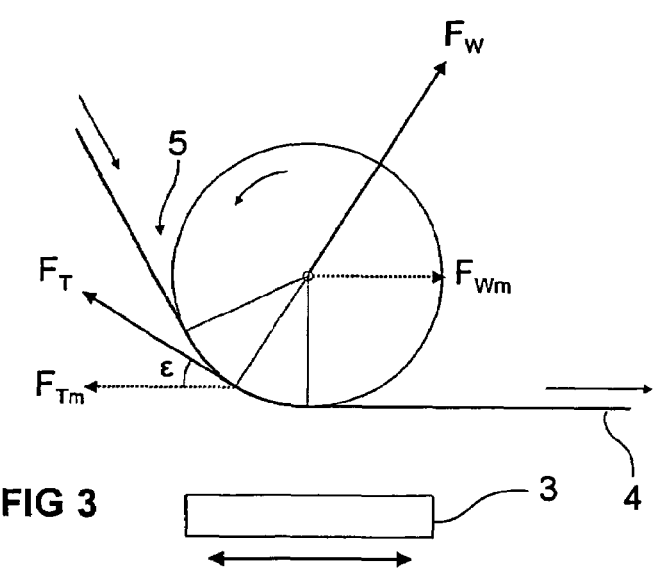

FIG. 3 shows the above force vectors and their components in the measuring direction of the measuring sensor. It should be noted that the vectors and their components are intended only to illustrate the invention, and thus their magnitudes do not reflect any detailed and specific case. FIG. 3 shows that force $F_T$ directed by the roll torque to the material web is directed to the material web from the centre point of the wrap angle on average, and it is in the direction of the tangent drawn in this outer point of the roll. The direction of this force depends on whether the measuring roll is accelerating or decelerating. In the case of FIG. 3, the measuring roll is decelerating when the direction of force $F_T$ is indicated.

When using the markings shown in FIG. 2 for wrap angle $\alpha$ and its initial angle $\beta$, the direction $\epsilon$ of force $F_T$ can be defined as $\alpha/2+\beta$ with respect to the horizontal in accordance with FIG. 3. From this angle it is further possible to calculate the force component acting on the measuring sensor with equation $F_{Tm}=F_T \cos(\epsilon)$. Web tension that also takes into account the effect of the torque of the tension measuring roll motor drive can be calculated with equation $F_{cor}=F_{meas}-F_{Tm}$.

In the method of the invention, it is also possible to take into consideration the observation that as the speed of the material web and measuring roll increases, the wrap angle becomes smaller. This is due to the fact that an air cushion is formed between the measuring roll and material web on the entry side 5 of the material web. The length of this air cushion increases as a function of the speed, thus reducing the wrap angle $\alpha$ and correspondingly increasing its initial angle $\beta$. The air cushion makes the directions of the force vectors drawn in the figures change as the speed changes. The size of the change can be best detected by experimentally running the material web at a constant tension and detecting the change in the measured tension.

The method of the invention can be implemented with a system in which the measuring roll motor is preferably controlled with a frequency converter that is directly able to define the torque produced by the motor. This frequency converter can preferably be used in defining the frictional couple and moment of inertia before the actual running of the material web. The system of the invention also comprises calculation means for making calculations necessary for the method. At their simplest, these calculation means are processor means of a frequency converter or, correspondingly, calculation means of process control equipment that controls the apparatus where the tension measuring roll is. The calculation means can also be a combination of the frequency converter and process control equipment, in which case each performs part of the calculations.

The operation of the method and apparatus of the invention is described in the following by way of example. A continuous material web has been achieved and its tension needs to be measured and adjusted based thereon. The material web has been fed to the measuring roll and the force sensors of the measuring roll register in a known manner the measuring-direction force components acting on them.

Before using the measuring roll, its frictional couple and moment of inertia have been determined for instance by using the measuring roll motor attached to the measuring roll shaft and the frequency converter controlling it. Before use, the wrap angle, its initial angle and possibly other geometric quantities have been defined and the information stored as parameters in the system memory. An example of other geometric quantities that affect the measurement is the position of the measuring sensor.

When the material web runs on the measuring roll, the measuring sensor provides an uncorrected reading. To correct the reading, the torque generated by the motor drive is determined. As earlier presented, this is in general obtained automatically and directly from the frequency converter of the motor drive. The frictional couple and moment of inertia related to acceleration or deceleration are subtracted from this torque of the motor drive. As earlier presented, the moment of inertia only affects the system when the speed changes. This change of speed is also obtained directly from the frequency converter or process control equipment that thus provides the measuring roll with a speed reference.

When the torques related to frictions and speed change have been subtracted from the torque generated by the drive, the arrangement calculates the force acting on the material web on the basis of the torque and roll radius. This force is not necessarily immediately in a direction that as a whole affects the result shown by the measuring sensor. A measuring-direction component needs to be separated from the force acting on the material web. As stated earlier this component can be calculated once the wrap angle and its initial angle as well as the location of the measuring sensor are known.

This measuring-direction component is subtracted from the result provided by the measuring sensor to obtain the corrected tension information. This corrected tension information can further be changed to the actual force effect direction, as can also be done in the conventional case without error compensation.

If the used speed is such that it decreases the wrap angle and increases the initial angle of the wrap angle, this change is taken into account in the calculation. Said angles can be presented as functions of the web or angular velocity, in which case the system takes the change into account automatically.

When utilising the method and system of the invention, the tension measuring roll can be used to actively transport the web, because the forces directed to the material web are taken into account.

Above, the method of the invention is described in particular such that the roll motor is controlled with a frequency converter. The method can also be implemented by controlling the roll motor with a direct-current drive.

It is apparent to a person skilled in the art that the basic idea of the invention can be implemented in many different ways. The invention and its embodiments are thus not restricted to the examples described above, but may vary within the scope of the claims.

The invention claimed is:

1. A method for compensating an error in the tension measurement of a continuous material web in connection with a motor drive-operated tension measuring roll, whereby the method comprises a step for determining tension $T_{meas}$ of the material web with a force sensor positioned to the tension measuring roll, wherein the method comprises the steps of defining frictional couple $T_\mu$ and moment of inertia J of the tension measuring roll before a run-time tension measurement, defining run-time torque $T_{mot}$ generated by the drive motor of the tension measuring roll, defining torque $T_{wm}$ directed by the tension measuring roll to the material web by subtracting frictional couple $T_\mu$ and moment of inertia J from defined drive motor-generated torque $T_{mot}$, defining force $F_T$ directed to the material web from torque $T_{wm}$ directed by the tension measuring roll to the material web, defining measuring-direction force component $F_{Tm}$ of the measuring sensor directed by the measuring roll to the material web from force $F_T$ directed to the material web, and subtracting from the tension $F_{meas}$ defined with the force sensor measuring-dimension force component $F_{Tm}$ of the measuring sensor directed to the material web by the measuring roll to obtain a corrected measuring signal.

2. A method as claimed in claim 1, wherein the frictional couple is defined by using the motor drive.

3. A method as claimed in claim 1, wherein the moment of inertia is defined by using the motor drive.

4. A method as claimed in claim 1, wherein the moment of inertia is defined by calculation.

5. A method as claimed in claim 1, wherein the torque generated by the drive motor is defined in the frequency converter controlling the drive motor.

6. A method as claimed in claim 1, wherein defining measuring-direction force component $F_{Tm}$ of the measuring sensor comprises the steps of defining, prior to starting tension measurement, the wrap angle ($\alpha$) of the material web and the initial angle ($\beta$) of the wrap angle, and calculating, on the basis of the defined angles, the size of the measuring-direction force component.

7. A method as claimed in claim 6, wherein the sizes of the wrap angle and its initial angle are functions of the web speed such that as the speed increases, the wrap angle becomes smaller and the initial angle becomes bigger.

8. A method as claimed in claim 1, where in a total force in the direction of the force acting on the measuring roll of the material web is calculated from the corrected measuring-direction measuring signal.

9. A system for compensating an error in the tension measurement of a continuous material web in connection with a motor drive-operated tension measuring roll, whereby the system comprises a force sensor arranged to the tension measuring roll to define the tension of the material web, wherein the system comprises means for defining frictional couple $T_\mu$ and moment of inertia J of the tension measuring roll before the run-time tension measurement, means for defining torque $T_{mot}$ generated by the drive motor of the tension measuring roll during the run, calculation means arranged to define torque $T_{wm}$ directed to the material web by the tension measuring roll by subtracting frictional couple $T_\mu$ and moment of inertia J from the torque $T_{mot}$ generated by the drive motor, calculation means arranged to define force $F_T$ directed to the material web from the torque directed by the tension measuring roll to the material web, calculation means arranged to define measuring-direction force component $F_{Tm}$ of the measuring sensor directed to the material web by the measuring roll from force $F_T$ directed to the material web, and calculation means arranged to subtract measuring-direction force component $F_{Tm}$ of the measuring sensor directed by the measuring roll to the material web from tension $F_{meas}$ defined by the force sensor to produce a corrected web tension value.

10. A system as claimed in claim 9, wherein the calculation means are made up of a frequency converter or process control device or a combination thereof.

11. A system as claimed in claim 9, wherein the means for defining the moment of inertia and frictional couple comprise a frequency converter or process control device.

* * * * *